INVENTOR
RICHARD E. CRAGG
BY R. C. Terry
ATTORNEY

Sept. 23, 1969 R. E. CRAGG 3,468,492
WINDING REEL
Filed Nov. 8, 1967 2 Sheets-Sheet 2

United States Patent Office 3,468,492
Patented Sept. 23, 1969

3,468,492

WINDING REEL

Richard E. Cragg, Winnetka, Ill., assignor to Teletype Corporation, Skokie, Ill., a corporation of Delaware Filed Nov. 8, 1967, Ser. No. 681,545
Int. Cl. B65h 75/18
U.S. Cl. 242—71.8 6 Claims

ABSTRACT OF THE DISCLOSURE

A winding drum and two non-similar flanges, one of the flanges having a hub thereon which is received by the second flange, detents in one flange engaging detent notches in the other flange to prevent relative rotation. Lugs on the hub are received in surfaces provided in the second flange and prevent flange separation.

BACKGROUND OF THE INVENTION

Winding reels for use with data transmission tapes, etc. are usually supplied in one of two forms. The more common form is called a two-flange reel and is comprised of a hub and two flanges extending radially therefrom, the flanges being spaced apart a distance equal to the width of tape to be wound. Such reels are convenient when large lengths of tape are to be wound. The other form of winding reel is called an open-face reel and is comprised of a hub, a single flange extending from the hub and a winding drum mounted on the flange around the hub. Such wheels provide for easy threading and removal of short lengths of tape.

In many tape winding applications there is a need for both two-flange and open-face reels since both long and short lengths of tape are wound. In order to minimize the cost of obtaining winding reels it is advantageous to have a single reel serve both as a two-flange and as an open-face reel. And, in order to have such a reel be as practical as possible it is desirable that the reel be convertible from one form to the other while it is engaged with a tape winder since lengths of tape to be wound often turn out to be longer or shorter than at first supposed.

SUMMARY OF THE INVENTION

In the preferred embodiment a combination open-face and two-flange winding reel capable of being transformed from one state to the other while the reel is engaged with a winding device is comprised of an open-face reel having at least one lug projecting radially from its hub and an auxiliary flange comprised of a disk having an aperture of slightly larger diameter than the hub extending axially through it for permitting engagement of the auxiliary flange with the hub, having a slot extending radially from the aperture for permitting the auxiliary flange to pass over a winding device drive member when the drive member is engaged with the hub and having a surface extending from the slot for engagement with the lug on the hub to prevent axial separation of the reel and the auxiliary flange.

DESCRIPTION OF THE DRAWINGS

A more complete understanding of the invention may be had by referring to the following detailed description when taken in conjunction with the drawings wherein.

DETAILED DESCRIPTION

Figure 1:
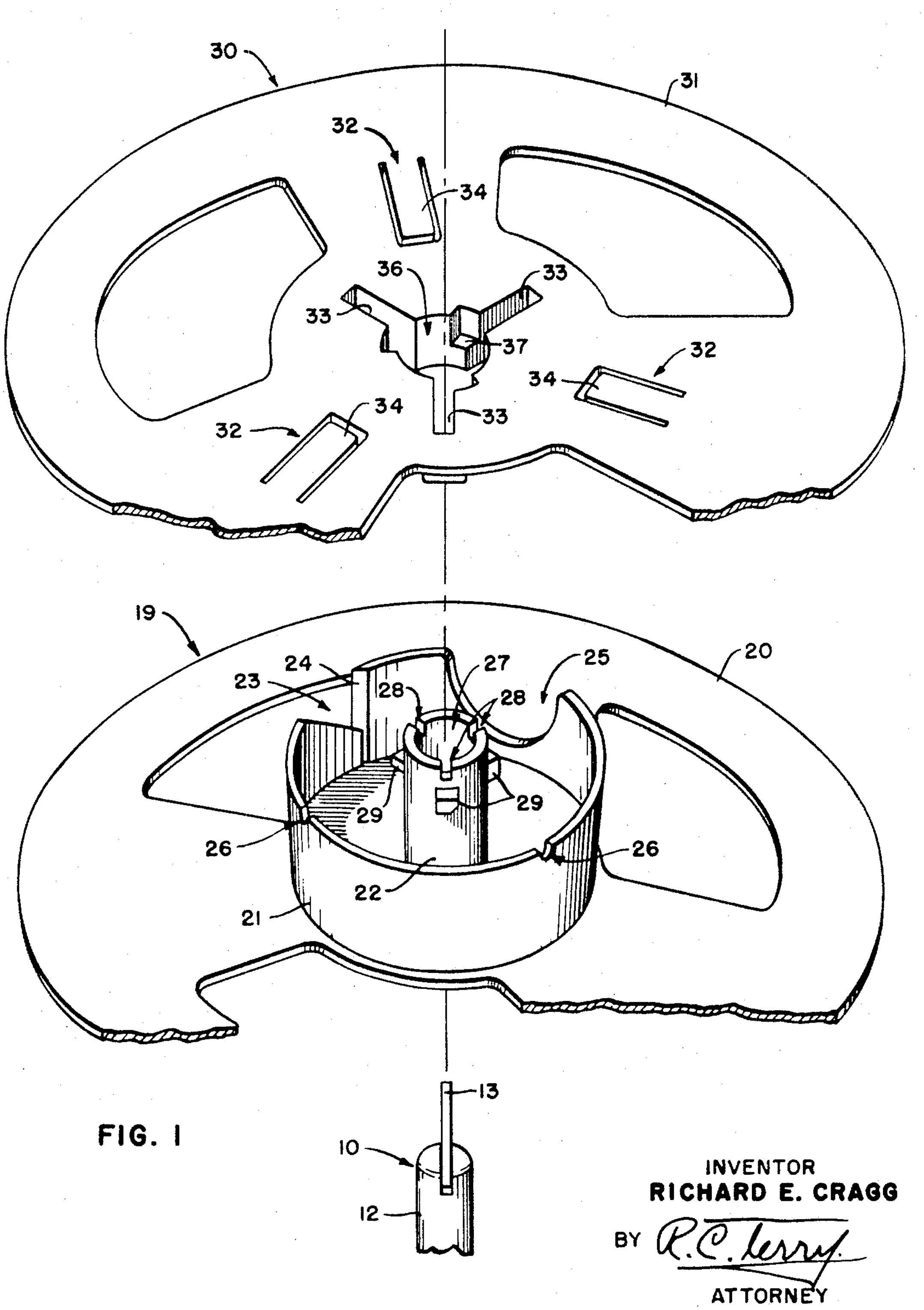
FIGURE 1 is an exploded, perspective view of a winding reel employing the invention.
Figure 4:
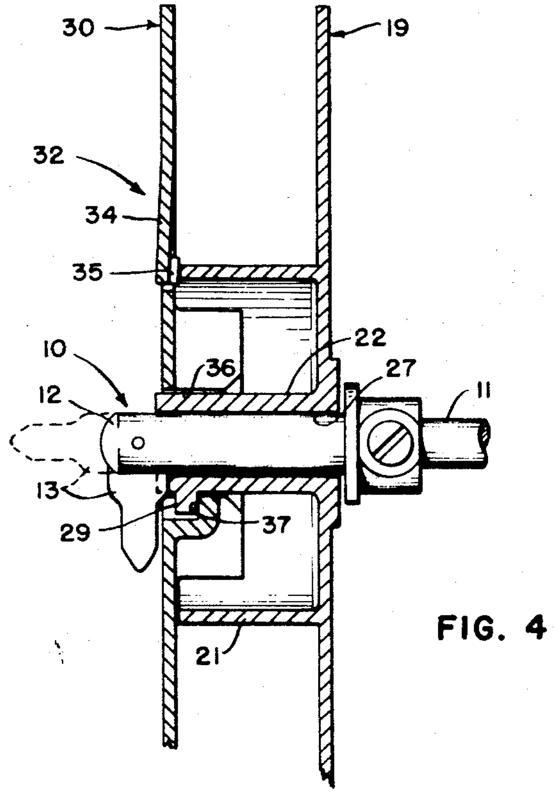
FIGURE 4 is a sectional view taken along the line 4—4 in FIGURE 3 in the direction of the arrows.

Referring now to the drawings, wherein like reference numerals designate like parts throughout the several views, with particular reference being had to FIGURES 1 and 4, there is shown a reel driving member 10. As is best shown in FIGURE 4, the driving member 10 is normally mounted on a drive shaft 11 and is comprised of a hub 12 and a driving finger 13 which is pivotally supported on the hub 12 and a adapted for movement between two positions one of which is shown in full lines and the other of which is shown in dashed lines in FIGURE 4. In use the finger 13 is positioned in the dashed line position shown in FIGURE 4 and a winding reel is slipped over the finger 13 onto the hub 12. The finger 13 then is moved to the full line position shown in FIGURE 4 whereat it engages the reel. Thereafter, if the drive shaft 11 is rotated the torque of the shaft is transferred to the reel by the finger 13 and the reel is rotated. During rotation the reel is maintained in a centered position by the hub 12.

Referring to FIGURE 1 there is shown a winding reel assembly adapted for driving engagement with a drive member 10. The reel includes a first flange 19 which is comprised of a disk member 20, a winding drum 21 mounted on the disk 20 and a hub 22 also mounted on the disk 20. The winding drum 21 has a tape gripping slot 23 defined by a surface 24 extending chordally with respect to the radius of the drum 21, a tape removal thumb hole 25 and a pair of detent notches 26 formed in it. The hub 22 has a hole 27 having an inside diameter adapted for snug engagement with the hub 12 of the drive member 10 formed through it. The hub 22 also has three driving slots 28 adapted to receive the finger 13 of the drive member 10 formed in it and a plurality of lugs 29 extending from it. The hub 22 also has three driving slots 28 adapted to receive the finger 13 of the drive member 10 formed in it and a plurality of lugs 29 extending from it. Each of the lugs is positioned below and extends parallel to one of the slots 28.

The first flange 19 comprises an ordinary open-face winding reel to which the detent notches 26 and the lugs 29 have been added. As an open-face reel the first flange 19 is adapted for driving engagement with the drive member 10 and upon such engagement is adapted to have a tape or other web inserted in its tape gripping slot 23 so that upon rotation of the driving member 10 the tape will be wound about the winding drum 21. After a suitable length of tape has been wound upon the reel the tape may be removed by gripping it through the thumb hole 25. Open-face reels of this type operate exceedingly well as winding devices for short lengths of tape because the threading of such reels and the removal of wound lengths of tape from such reels is extremely simple.

Also illustrated in FIGURE 1 is an auxiliary or second flange 30 which is adapted to be fastened to the first flange 19 to form a two flange tape reel. The auxiliary flange 30 is comprised of a disk 31 having a plurality of detent members 32 formed in it and having a plurality of slots 33 formed through it. As is best shown in FIGURE 1 the detent members 32 are comprised of a spring portion 34 and a pointed tip 35 extending from the spring portion and having suitable dimensions for engagement with the detent notches 26 of the first flange 19. As is best shown in FIGURE 3 the slots 33 have a length longer than the length of the finger 13 of the driving member 10 when the finger 13 is in the full line position shown in FIGURE 4.

Referring again to FIGURE 1 the auxiliary flange 30 is also provided with a hub 36 which has an inside diameter of suitable size to snugly receive the hub 22 of the first flange 19 formed on it and which extends from the disk 31. The material of the hub 36 extends around each of the slots 33 and is cutaway in three portions each extending circumferentially from one of the slots 33 thereby providing three surfaces 37 each positioned a predetermined distance from the polar surface of the disk 31 and each adapted to receive one of the lugs 29 of the first flange 19.

The auxiliary or second flange 30 is adapted to be positioned on and coupled to the first flange 19 regardless of whether or not the first flange 19 is engaged with the winding member 10. Assuming that the first flange 19 is mounted on the hub 12 of the winding member 10 and that the finger 13 of the winding member 10 is positioned in one of the slots 28 in the hub 22 of the first flange 19 in the position shown in full lines in FIGURE 4, the auxiliary or second flange is merely positioned in axial alignment with the first flange 19 and with one of slots 33 extending parallel to the finger 13. As the two flanges 19 and 30 are axially mated together the hub 36 of the second flange fits over the hub 22 of the first flange and, since the slots 33 of the second flange are longer than the finger 13, the disk 31 of the second flange slips past the finger 13 into engagement with the first flange 19. The mating motion of the two flanges continues until the disk 31 of the second flange engages the outer edge of the winding drum 21 of the first flange. At this time the surfaces 37 of the second flange are positioned in alignment with the surfaces of the lugs 29 nearest the disk 20 so that when the second flange is rotated with respect to the first flange the surfaces 37 are positioned under the lugs 29. As the rotating motion is completed the pointed tips 35 of two of the detents 32 are driven into the detent notches 26 of the winding drum 21 by the spring portions 39 of the detent 32. This fully couples the second flange 30 to the first flange 19 to form a two flange winding reel wherein the lugs 29 and the surfaces 37 cooperate to prevent axial separation of the two flanges and the detent notches 26 and the detents 32 cooperate to prevent relative rotation of the two flanges.

Figure 2:
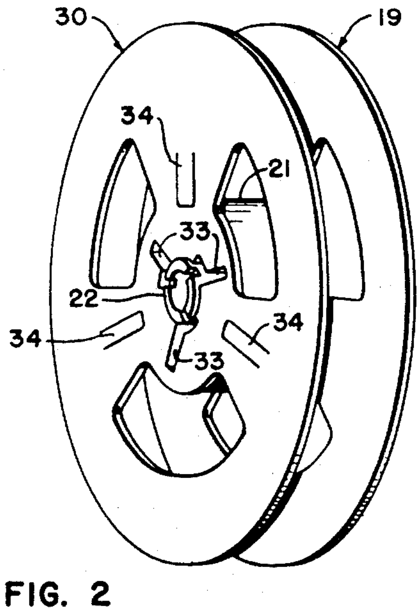
FIGURE 2 is a reduced view of the reel shown in FIGURE 1 in its assembled condition.
Figure 3:
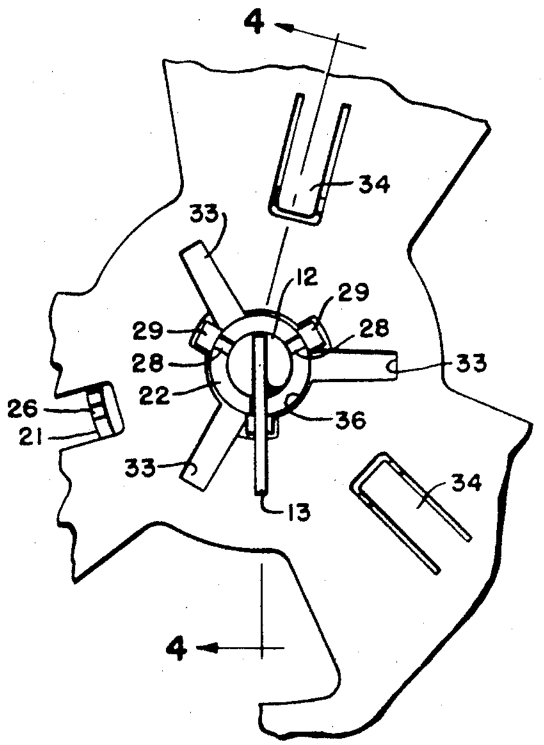
FIGURE 3 is a partial front view of the assembled reel shown in FIGURE 2 in which certain parts have been broken away to more clearly illustrate certain features of the invention.

Referring now to FIGURES 2 and 3 it will be seen that when the reel is in the assembled position the lugs 29 are positioned over the surfaces 37 which extend circumferentially from the slots 33. At this time the finger 13 is positioned over the disk 31 in engagement with one of the slots 28, the same position occupied by the finger 13 throughout the coupling operation. In FIGURE 3 one of the detents 32 has been broken away to show that in its assembled condition the detent notches 26 of the winding drum 21 are positioned directly below the center of the detents 32. In FIGURE 4 it is shown that in the assembled condition the lugs 29 are snugly engaged with the surfaces 37 and that the pointed tips 35 of the detents 32 are positioned in the detent notches 26.

From the foregoing description it should be obvious that the flanges 19 and 30 of the winding reel may be assembled into a two flange reel when the first flange 19 is not in engagement with the winding member 10. The assembly operation is exactly identical to the assembly operation described above in that the slots 33 of the second reel 30 are aligned with the lugs 29 and that the parts are then mated until the lugs 29 are aligned with the surface 37. The excess length of the slots 33 which is provided to allow the second flange 30 to fit over the finger 13 of the driving member 10 is simply not utilized in this operation. It should also be obvious that disassembly of the two flanges can be accomplished regardless of whether the reel is engaged with the driving member 10 by simply rotating the auxiliary flange 30 to bring the lugs 29 into the slots 33 and then axially separating the flanges 19 and 30.

Although only one embodiment of the invention is shown in the drawings and described in the foregoing specification it will be understood that the invention is not limited to that specific embodiment, but is capable of modification and rearrangement, and substitution of parts and elements without departing from the scope of the invention.

I claim:

1. In combination with an open-face reel of the type comprised of a disk, a hub of predetermined diameter mounted on the disk and means on the hub adapted for driving engagement by a reel drive member of predetermined size, an auxiliary flange for converting the open-face reel into a two-flange reel including:

a disk having a first aperture formed through it of larger diameter than the diameter of the hub for permitting the auxiliary flange to be mounted on the open-face reel and having a second aperture formed through it of larger size than the size of the reel drive member for permitting the auxiliary flange to be mounted on the open-face reel when the drive member is engaged with the reel and including means for securing the auxiliary flange to the open-face reel.

2. The combination according to claim 1 wherein the means for securing the auxiliary flange to the open-face reel includes at least one lug formed on the hub of the reel and a surface formed on the auxiliary flange and positioned for engagement with the lug of the open-face reel to prevent axial separation of the reel and the flange when the flange is positioned on the reel.

3. The combination according to claim 2 wherein the second aperture is a slot extending from the first aperture, wherein the surface extends from the slot and wherein the reel drive member engages a portion of the hub so that the surface engages the lug after the auxiliary flange has passed over the drive member as it is engaged with the open-face reel.

4. A winding reel for use with reel drive members of the type including a cylindrical shaft and a drive finger extending a predetermined distance radially from the shaft comprising:

a cylindrical hub having a hole extending axially through it for receiving the shaft and having a groove extending radially from the hole for receiving the drive finger;

a lug projecting radially from one end of the hub;

a flange projecting radially from the other end of the hub, and a disk adapted for attachment to the hub and having an aperture formed axially through it for allowing the disk to slip over the hub, having a slot at least as long as the distance the finger extends from the shaft extending from the aperture for allowing the disk to slip past the finger and having a surface positioned for engagement with the lug at a location between the lug and the flange to prevent axial separation of the hub and the disk upon relative rotation between the hub and the disk when the disk is positioned on the hub.

5. The winding reel according to claim 4 further including a winding drum positioned on the flange around the hub and having a tape gripping slot defined by side extending chordally with respect to the radius of the drum.

6. The winding reel according to claim 5 wherein the winding drum also has notches formed in it and wherein the disk has at least one detent formed in it at a predetermined position relative to the surface so that when the surface is engaged with the lug the detent engages the notch and prevents relative rotation of the disk and the hub.

References Cited

UNITED STATES PATENTS

| | | | |
|---|---|---|---|
| 1,861,882 | 6/1932 | Ross | 242—74.2 |
| 3,056,563 | 10/1962 | Whitnah. | |
| 3,211,392 | 10/1965 | Mohr. | |

NATHAN L. MINTZ, Primary Examiner